United States Patent
Chen et al.

(10) Patent No.: US 7,254,457 B1
(45) Date of Patent: Aug. 7, 2007

(54) MANUFACTURING PROCESS CONTROL METHODS AND SYSTEMS

(75) Inventors: Ju-Kau Chen, Changhua (TW); Meng-Chao Huang, Jhudong Township, Hsinchu County (TW); Rebecca Hsu, Shinchu (TW); Chih-Jen Pan, Hsinchu (TW); Amy Chen, Jhubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 19 days.

(21) Appl. No.: 11/332,927

(22) Filed: Jan. 17, 2006

(51) Int. Cl.
*G06F 19/00* (2006.01)

(52) U.S. Cl. .................. 700/112; 700/99; 700/100; 700/108; 700/121; 705/26

(58) Field of Classification Search ............ 700/99, 700/100, 108, 109, 110, 111, 112, 115; 702/182, 702/188; 438/5, 14; 705/22, 26
See application file for complete search history.

(56) References Cited

U.S. PATENT DOCUMENTS

| | | | |
|---|---|---|---|
| 5,014,208 A * | 5/1991 | Wolfson | 700/99 |
| 6,730,604 B1 * | 5/2004 | Liu et al. | 438/694 |
| 6,748,282 B2 * | 6/2004 | Lin | 700/121 |
| 7,155,361 B2 * | 12/2006 | Huang | 700/121 |
| 2002/0120357 A1 * | 8/2002 | Okabe et al. | 700/100 |
| 2005/0228526 A1 * | 10/2005 | Fang et al. | 700/115 |
| 2005/0256597 A1 * | 11/2005 | Chao et al. | 700/100 |
| 2005/0273191 A1 * | 12/2005 | Englhardt et al. | 700/112 |
| 2006/0020358 A1 * | 1/2006 | Chen | 700/100 |

\* cited by examiner

*Primary Examiner*—Leo Picard
*Assistant Examiner*—Charles Kasenge
(74) *Attorney, Agent, or Firm*—Thomas, Kayden, Horstemeyer & Risley

(57) ABSTRACT

A manufacturing process control system comprises a process controller and an order manager coupled to a network. When receiving an order for a batch of lots requiring a manufacturing process by a manufacturing entity, the order manager automatically provides an electronic list comprising entries corresponding to stages of the manufacturing process, at which processing of the lots can be held. When order manager receives designation of a first entry on the list through the network, the process controller monitors the lots while the lots are being processed in the manufacturing entity, and automatically directs at least one lot to be held before processing thereof at a stage to which the first entry corresponds.

22 Claims, 5 Drawing Sheets

MANUFACTURING PROCESS CONTROL METHODS AND SYSTEMS

BACKGROUND

The invention relates to network techniques, and in particular, to manufacturing process control.

As semiconductor products is increasingly designed smaller, manufacturing processes thereof also become complicated, typically from 100 stages ten years ago, and to around 400 stages today.

Customers of semiconductor foundries (Fabs), about 5% statistically, may have requirements to suspend their products at a particular stage in a Fab process flow. Some stages, such as ME1_PH, PO1_PH, CO1_PH, and others, can hold lot processing, but others can't, such as WAT1CUM3_1, N+S/D1_DI, and others. Additionally, different products comprise different manufacturing processes. These requirements are usually not acknowledged before their products are taped out because customers do not know which manufacturing stages can hold lot processing and how to exactly define these stages, thus complicating suspension of their products. Many interactions and communications, typically using e-mails and telephone, between customers and the foundry are required to manage this issue. This is redundant and unreliable, usually comprising equivocal expressions which may lead to misunderstanding, erroneously implemented operations on their products, and consequently great loss.

SUMMARY

Accordingly, manufacturing process control methods and systems are provided.

An exemplary embodiment of a manufacturing process control system comprises an order manager coupled to a network and a process controller coupled to the order manager. When receiving an order for a batch of lots requiring a manufacturing process by at least one manufacturing entity, the order manager automatically provides an electronic list comprising entries corresponding to stages of the manufacturing process, at which processing of at least one of the lots can be held. The order manager receives designation of a first entry on the list through the network. The process controller receives a notification about the designation from the order manager, monitors the lots while the lots are being processed in the manufacturing entity, and automatically directs at least one lot to be held before processing at a stage to which the first entry corresponds according to the designation.

An exemplary embodiment of a manufacturing process control method is implemented in a manufacturing process control system comprising an order manager coupled to a network and a process controller coupled to the order manager. When receiving an order for a batch of lots requiring a manufacturing process by at least one manufacturing entity, an electronic list is provided through the network by the order manager, comprising entries corresponding to stages of the manufacturing process, at which processing of at least one of the lots can be held. designation of a first entry is received by the order manager through the network. While the lots are being processed in the manufacturing entity, the process controller monitors the lots and automatically directs at least one lot to be held before processing at a stage to which the first entry corresponds according to the designation.

An exemplary embodiment of a manufacturing process control system comprises a database, an order manager coupled to the database and a network, and a process controller coupled to the order manager. The database stores manufacturing stages of at least one pilot yield run. When receiving, from a computer coupled to the network, an order for a batch of lots requiring a manufacturing process by at least one manufacturing entity, the order manager automatically locates the manufacturing stages of a pilot yield run corresponding to the batch from the database, determines which stage therein is capable of holding lot processing, and provides an electronic list comprising entries corresponding to determined stages capable of holding lot processing to the computer through the network. The process controller automatically directs the lots in the manufacturing process according to settings on the list.

DESCRIPTION OF THE DRAWINGS

The invention can be more fully understood by reading the subsequent detailed description and examples with references made to the accompanying drawings, wherein.

DETAILED DESCRIPTION

Manufacturing process control systems and methods are provided.

Figure 1:
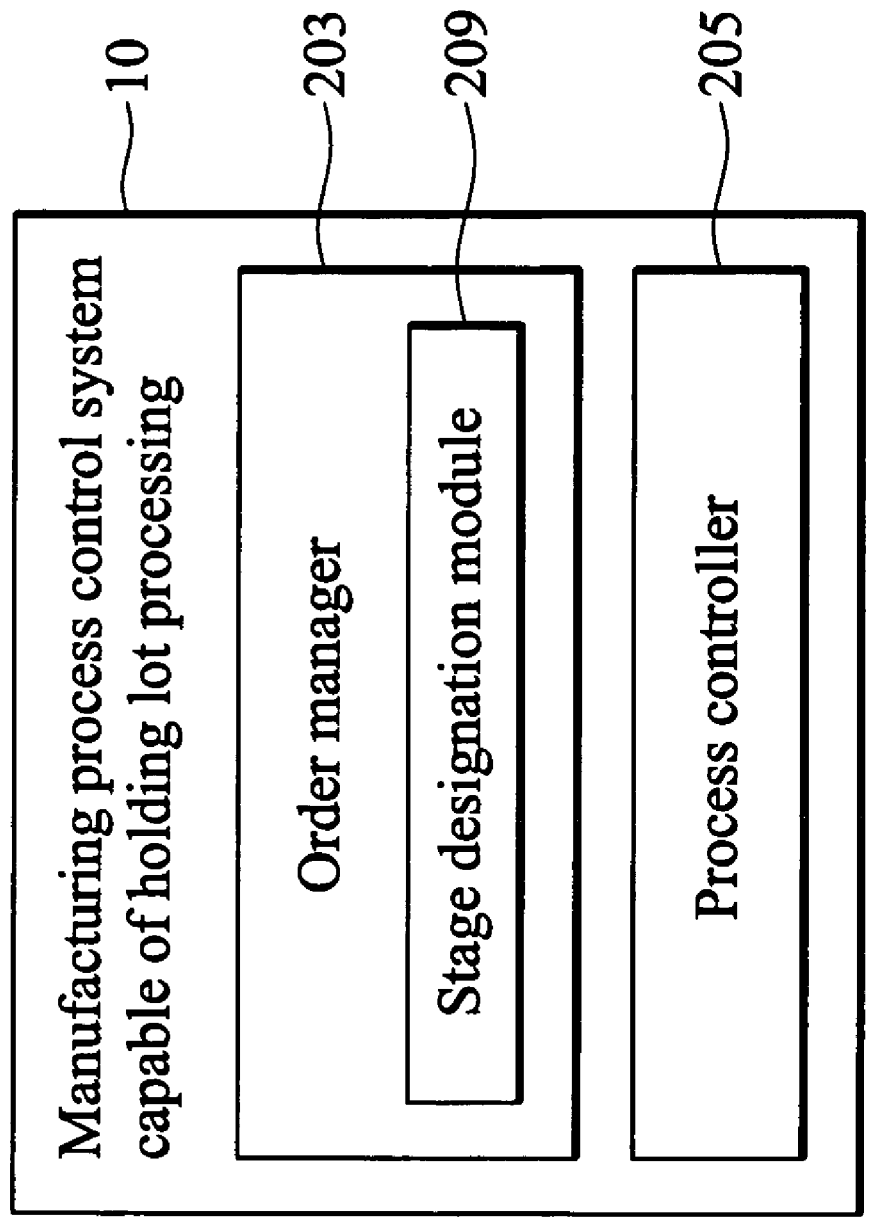
FIG. 1 is a block diagram of an exemplary embodiment of a manufacturing process control system.

An exemplary embodiment of manufacturing process control system 10 shown in FIG. 1 comprises order manager 203 and process controller 205 coupled thereto may be implemented in a semiconductor foundry. Order manager 203 comprises stage designation module 209 capable of providing electronic lists of lot manufacturing stages at which processing of lots can be held.

Figure 2:
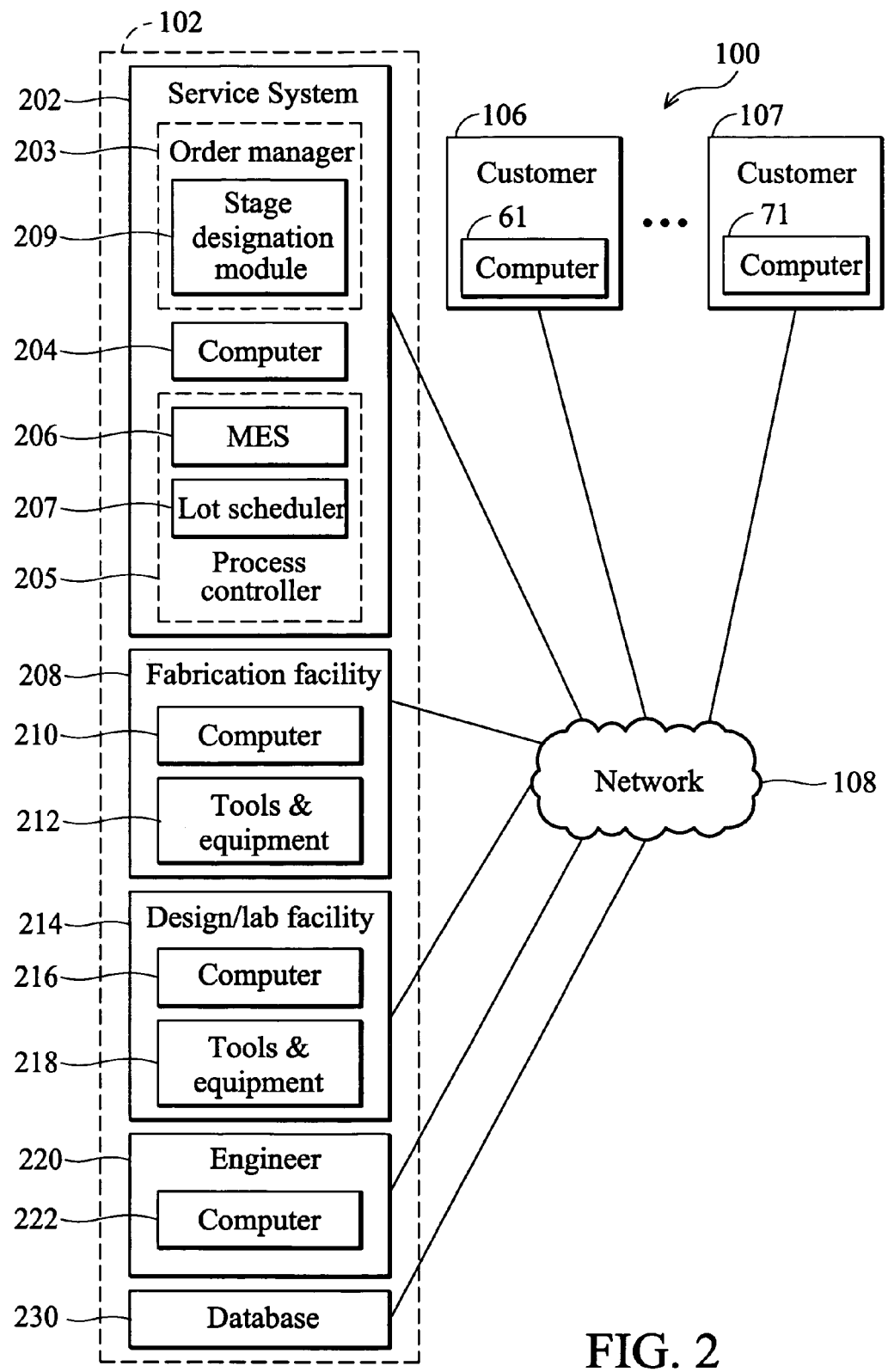
FIG. 2 is a block diagram of an exemplary embodiment of an semiconductor foundry.

In FIG. 2, semiconductor foundry 102 comprises a plurality of entities, each of which includes a computer coupled to other computers and customers (such as customers 106 and 107) through network 108. Network 108 may be the Internet or an intranet implementing network protocols, such as transmission control protocol (TCP). Customer 106 may be an IC design company or other entity for IC processing. Each computer included in the entities comprises a network interface.

Service system 202 is an interface between customers (such as customers 106 and 107) and semiconductor foundry 102, transferring information about semiconductor manufacturing. Service system 202 includes computer 204 facilitating such communication, order manager 203, and process controller 205. Order manager 203 comprising stage designation module 209 may be a computer or a system integrated into service system 202 to receive and process orders received from customers.

Processor controller 205 comprises manufacturing execution system (MES) 206 and lot scheduler 207, such as a wafer start execution system (WSES).

MES 206, coupled to other systems and entities of semiconductor foundry 102, performs various operations to facilitate IC manufacture. For example, MES 206 can receive various real-time information, organize and store the information in a centralized database, manage work orders, workstations, manufacturing processes and relevant documents, and track inventory.

Database 230 is an exemplary storage unit storing various manufacturing information including routes of lot processing. Before a batch of lots is put into mass production, pilot yield runs corresponding thereto are typically processed in advance. Routes of pilot yield runs may be stored therein.

Fabrication facility 208 fabricates ICs. Accordingly, fabrication facility 208 includes fabrication tools and equipment 212. For example, tools and equipment 212 may comprise an ion implantation tool, a chemical vapor deposition tool, a thermal oxidation tool, a sputtering tool, various optical imaging systems, and software controlling the various tools and equipment. Fabrication facility 208 also includes computer 210.

Design/lab facility 214 conducts IC design and testing. Design/lab facility 214 may comprise design/test tools and equipment 218. The tools and equipment 218 comprise one or more software applications and hardware systems. Design/lab facility 214 also comprises computer 216.

Engineer 220 collaborates on IC manufacturing with other entities, such as service system 202 and other engineers. For example, engineer 220 can collaborate with other engineers and the design/lab facility 214 on design and testing of ICs, monitor fabrication processes at the fabrication facility 208, and receive information regarding runs and yield. Engineer 220 also communicates directly with customers, using computer 222 to perform various operations.

Note that configuration of the entities of semiconductor foundry 102 is not limited to FIG. 2. They can be centralized in a single location or distributed. Some entities may be integrated into other entities.

Figure 3:
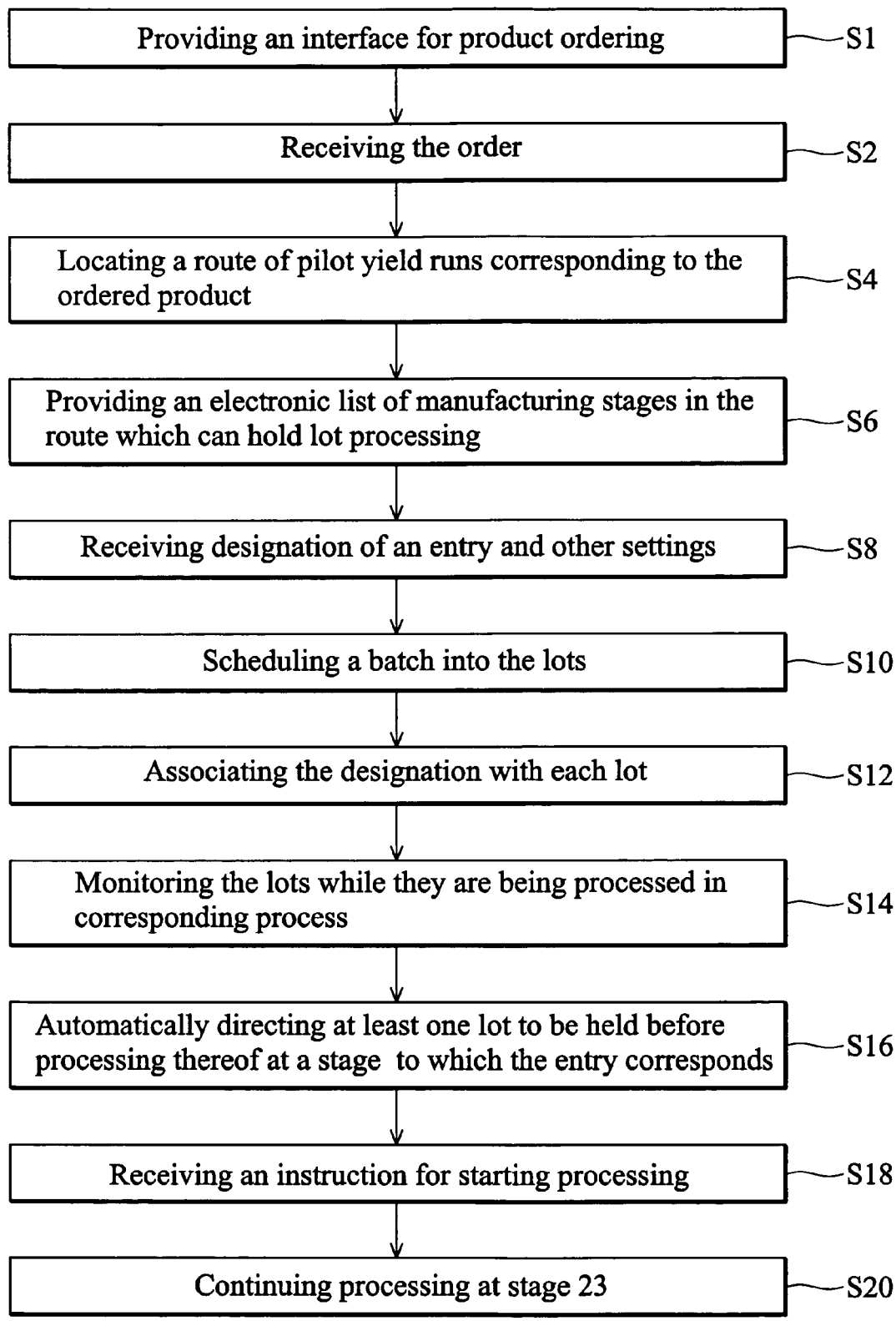
FIG. 3 is a flowchart of an exemplary embodiment of a manufacturing process control method.

With reference to FIG. 3, order manager 203 provides an interface for product ordering (step S1). The interface may be web pages transmitted by order manger 203 to computer 61 and comprise various field for inputting order information. Customer 106 orders a batch (such as batch 25 in FIG. 5) of lots requiring a manufacturing process by semiconductor foundry 102 through network 108 utilizing computer 61. Order manager 203 receives the order including identification (such as product number) of the batch (step S2).

Stage designation module 209 first determines the batch identification (such as product number) and automatically locates a route (such as process 20 in FIG. 4) of pilot yield runs corresponding to the product number from database 230 to provide an electronic list of stages capable of holding lot processing (step S4). Stage designation module 209 automatically determines which stage in the located stages is capable of holding lot processing. Stage designation module 209 automatically provides electronic list 31 comprising stages of process 20 which can hold lot processing to computer 61 through network 108 (step S6). Each stage may correspond to a tool or an equipment of fabrication facility 208 or design/lab facility 214. Typically, not all stages in a process can hold lot processing. Thus, stage designation module 209 may provide representations of stages capable of holding lot processing in list 31 or indicating which stages are capable of holding lot processing from other stages in list 31 by different colors or other means.

Figure 4:
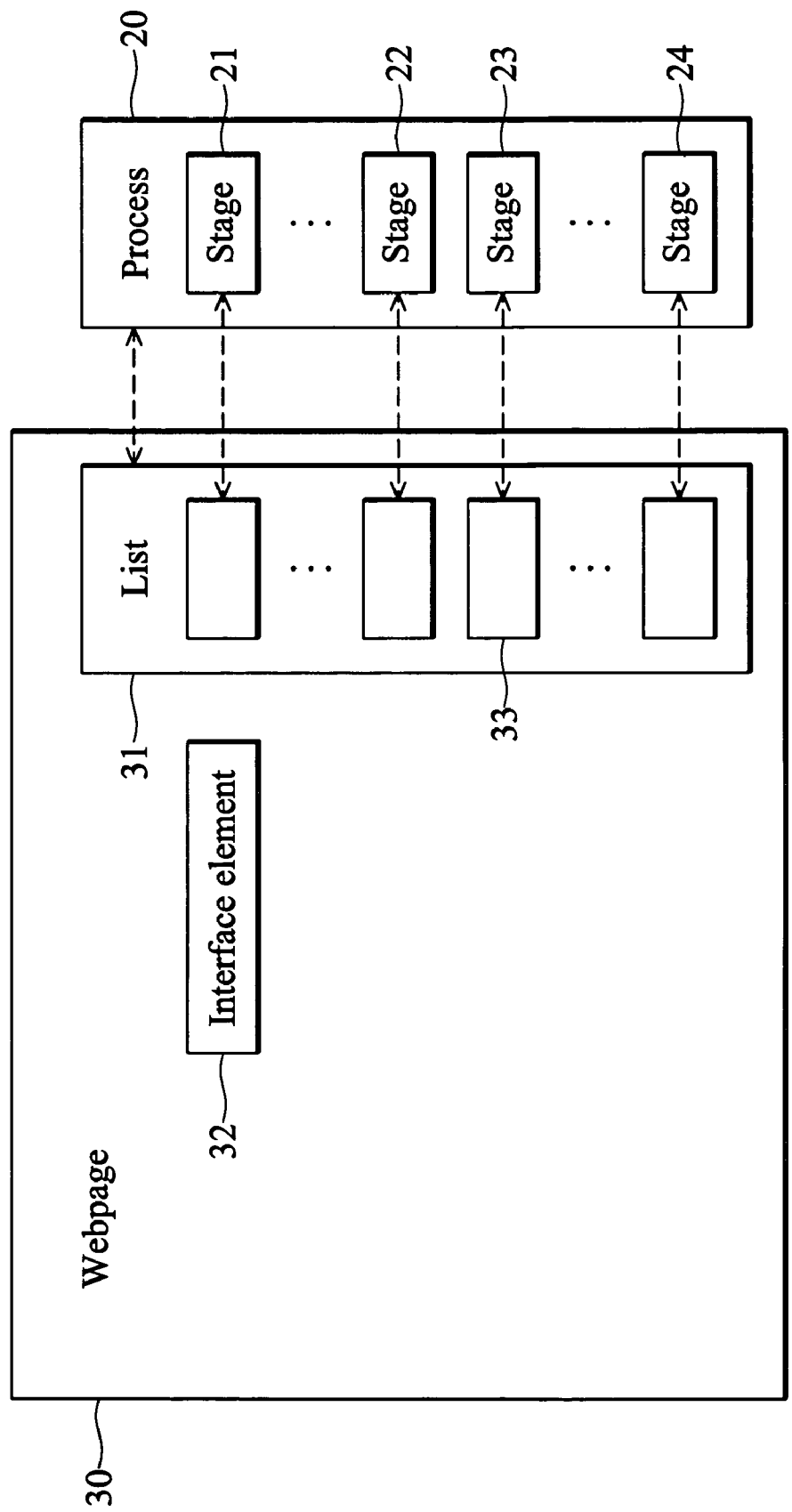
FIG. 4 is a schematic diagram of an exemplary embodiment of an interface for stage designation.

With reference to FIG. 4, list 31 comprises entries (such as entry 33) corresponding to stages capable of holding lot processing and at least one interface, such as checkboxes, for assigning the stages. List 31 may be composed into webpage 30 (such as in the Hypertext Markup Language (HTML) format) transmitted by stage designation module 209 to computer 61, but is not limited thereto. Webpage 30 may comprise interface element 32 for assigning the quantity of lots to be held at assigned stages.

Figure 5:
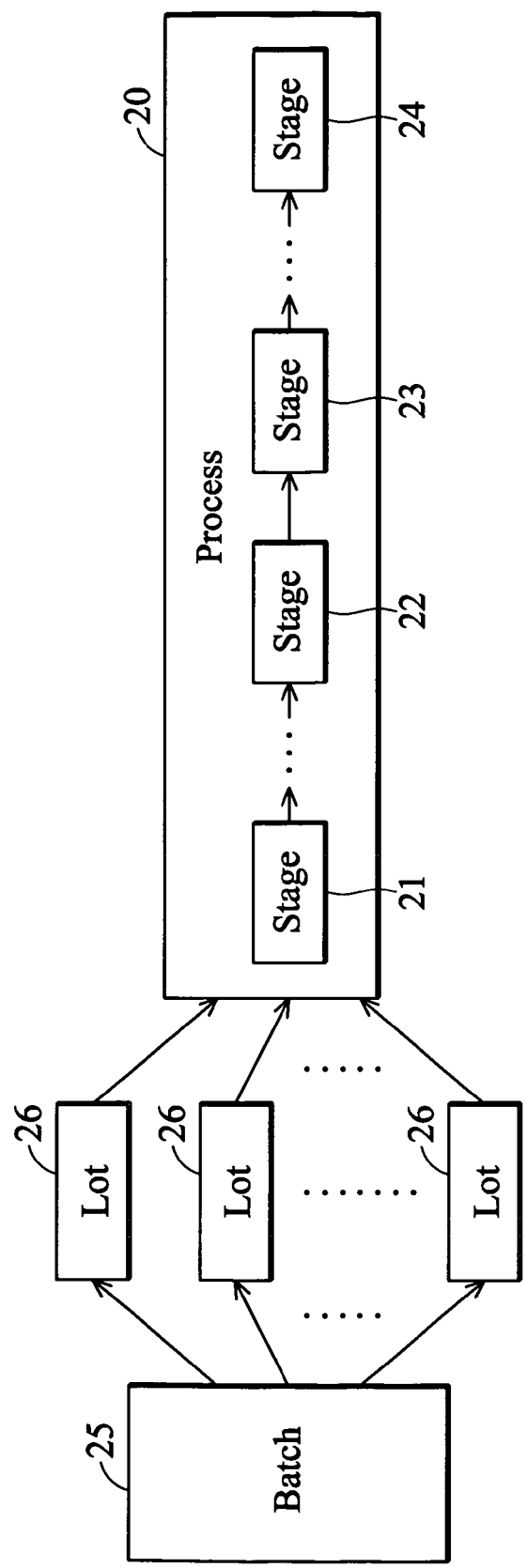
FIG. 5 is a schematic diagram of an exemplary embodiment of a manufacturing process and lots.

Stage designation module 209 receives settings on webpage 30, comprising designation of entry 33 and settings of interface element 32, from computer 61 through network 108 (step S8), wherein entry 33 corresponds to stage 23 shown in FIG. 5. Process controller 205 receives a notification about the designation from stage designation module 209. With reference to FIG. 5, lot scheduler 207 receives the notification, divides batch 25 into the lots 26 (step S10), and associates the designation with each lot 26 (step S12). MES 206 monitors lots 26 while lots 26 are being processed in process 20 (step S14). According to the designation, MES 206 automatically directs at least one lot to be held before processing thereof at stage 23 to which entry 33 corresponds (step S16).

For example, in process 20, processing of each lot 26 begins from stage 21, subsequently to stage 22, stage 23, and finally to stage 24. Each stage can process one or more lots. Thus, each lot 26 may progress asynchronously. If batch 25 is all designated to be held, MES 206 directs all lots 26 to be held at stage 22 or stage 23 before processing thereof at stage 23 corresponding to entry 33 according to the designation. If a portion of batch 25 is designated to be held, MES 206 directs the portion of lots 26 to be held before processing thereof at stage 23 according to the designation.

Thus, processing of lots 26 are held at stage 23. When MES 206 receives an instruction to begin processing of lots 26 held at stage 23 (step S18), lots 26 continue to stage 23 for processing (step S20).

Although the manufacturing process control systems and methods are illustrated with a semiconductor foundry, they can be implemented in other manufacturing entities. Thus, as soon as customers order a batch of lots, an electronic list of corresponding manufacturing stages capable of holding lot processing is provided, and designation of the stages can be confirmed when ordering.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A manufacturing process control system, comprising:
    an order manager coupled to a network, when receiving an order for a batch of lots requiring a manufacturing process by at least one manufacturing entity, automatically providing an electronic list comprising entries corresponding to stages of the manufacturing process, at which processing of at least one of the lots can be held, and receiving designation of a first entry through the network; and
    a process controller coupled to the order manager, receiving a notification about the designation from the order manager, monitoring the lots while the lots are being processed in the manufacturing entity, and, according to the designation, automatically directing at least one lot to be held before processing thereof at a stage to which the first entry corresponds.

2. The system as claimed in claim 1, wherein the manufacturing entity comprises a semiconductor foundry.

3. The system as claimed in claim 2, wherein the electronic list is composed into a webpage.

4. The system as claimed in claim 1, wherein the order manager provides an interface for assigning a portion of the batch to be held before processing thereof at the stage to which the first entry corresponds.

5. The system as claimed in claim 1, wherein, according to the designation, the process controller directs all of the lots to be held before processing thereof at the stage corresponding to the first entry.

6. The system as claimed in claim 5, further comprising a lot scheduler receiving the notification, dividing the batch into lots, and associating the designation with each lot.

7. The system as claimed in claim 6, wherein the process controller comprises a manufacturing execution system (MES).

8. The system as claimed in claim 1, further comprising a database storing manufacturing stages of at least one pilot yield run corresponding to the batch, wherein the order manager automatically locates the manufacturing stages of the pilot yield run from the database and determines which stage therein is capable of holding lot processing.

9. The system as claimed in claim 8, wherein the order manager indicates which stages are capable of suspending lot processing from entries of other stages in the list.

10. A manufacturing process control method, implemented in a manufacture process control system comprising an order manager coupled to a network and a process controller coupled to the order manager, comprising:
when receiving an order for a batch of lots requiring a manufacturing process by at least one manufacturing entity, automatic provision by the order manager of an electronic list through the network, comprising entries corresponding to stages of the manufacturing process, at which processing of at least one of the lots can be held;
receipt by the order manager of a designation of a first entry through the network; and
monitoring by the process controller of the lots while the lots are being processed in the manufacturing entity; and
automatic directing by the process controller of at least one lot to be held before processing thereof at a stage to which the first entry corresponds according to the designation.

11. The method as claimed in claim 10, wherein the manufacturing entity comprises a semiconductor foundry.

12. The method as claimed in claim 11, wherein the electronic list is composed into a webpage.

13. The method as claimed in claim 10, wherein the order manager provides an interface for assigning a portion of the batch to be held before processing thereof at the stage to which the first entry corresponds.

14. The method as claimed in claim 10, wherein, according to the designation, the process controller directs all of the lots to be held before processing thereof at the stage corresponding to the first entry.

15. The method as claimed in claim 14, the manufacturing process control system further comprising a lot scheduler receiving a notification about the designation, dividing the batch into lots, and associating the designation with each lot.

16. The method as claimed in claim 15, wherein the process controller comprises a manufacturing execution method (MES).

17. The method as claimed in claim 10, further comprising a database storing manufacturing stages of at least one pilot yield run corresponding to the batch, wherein the order manager automatically locates the manufacturing stages of the pilot yield run from the database and determines which stage therein is capable of holding lot processing.

18. The method as claimed in claim 17, wherein the order manager indicate which stages are capable of suspending lot processing from entries of other stages in the list.

19. A manufacturing process control system, comprising:
a database storing manufacturing stages of at least one pilot yield run;
an order manager coupled to the database and a network, when receiving, from a computer coupled to the network, an order for a batch of lots requiring a manufacturing process by at least one manufacturing entity, automatically locating the manufacturing stages of a pilot yield run corresponding to the batch from the database, determining which stage therein is capable of holding lot processing, and providing an electronic list comprising entries corresponding to determined stages capable of holding lot processing to the computer through the network; and
a process controller coupled to the order manager, automatically directing the lots in the manufacturing process according to settings on the list.

20. The system as claimed in claim 19, wherein the manufacturing entity comprises a semiconductor foundry.

21. The system as claimed in claim 20, wherein the electronic list is composed into a webpage.

22. The system as claimed in claim 21, wherein, according to the settings on the list, the process controller directs all of the lots to be held before processing thereof at a stage corresponding to a entry designated through the list and the network.

* * * * *